(12) United States Patent
Miller et al.

(10) Patent No.: US 7,306,647 B2
(45) Date of Patent: Dec. 11, 2007

(54) MIXED MATRIX MEMBRANE WITH MESOPOROUS PARTICLES AND METHODS FOR MAKING AND USING THE SAME

(75) Inventors: Stephen J. Miller, San Francisco, CA (US); Alexander Kuperman, Orinda, CA (US); De Q. Vu, Bakersfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 383 days.

(21) Appl. No.: 10/994,063

(22) Filed: Nov. 19, 2004

(65) Prior Publication Data

US 2006/0107830 A1 May 25, 2006

(51) Int. Cl.
*B01D 53/22* (2006.01)
(52) U.S. Cl. ............ 95/45; 95/51; 95/90; 95/902; 95/903; 96/4; 96/8; 96/10; 96/12; 96/14; 96/108; 264/176.1; 264/177.14
(58) Field of Classification Search ........... 95/45, 95/51, 90, 902, 903; 96/4, 8, 10, 12, 14, 96/108, 135, 153; 264/176.1, 177.14
See application file for complete search history.

(56) References Cited

U.S. PATENT DOCUMENTS

| | | |
|---|---|---|
| 3,457,170 A | 7/1969 | Havens |
| 3,567,632 A | 3/1971 | Richter et al. |
| 3,862,030 A | 1/1975 | Goldberg |
| 3,878,104 A | 4/1975 | Guerrero |
| 3,911,080 A | 10/1975 | Mehl et al. |
| 3,993,566 A | 11/1976 | Goldberg et al. |

(Continued)

FOREIGN PATENT DOCUMENTS

| | | |
|---|---|---|
| EP | 0 459 623 A1 | 12/1990 |
| EP | 0 459 623 B1 | 12/1991 |

OTHER PUBLICATIONS

O'Brien et al., A New Technique for the Measurement of Multicomponent Gas Transport Through Polymeric Films, Journal of Membrane Science, (1986), pp. 229-238, vol. 29, Elsevier Science Publishers B.V., Amsterdam—Printed in The Netherlands.

(Continued)

*Primary Examiner*—Jason M. Greene
(74) *Attorney, Agent, or Firm*—Richard J. Schulte (57) ABSTRACT

A mixed matrix membrane for separating gas components from a mixture of gas components is disclosed. The membrane comprises a continuous phase polymer with inorganic porous particles, preferably molecular sieves, interspersed in the polymer. The polymer has a $CO_2/CH_4$ selectivity of at least 20 and the porous particles have a mesoporosity of at least 0.1 cc STP/g. The mixed matrix membrane exhibits an increase in permeability of least 30% with any decrease in selectivity being no more than 10% relative to a membrane made of the neat polymer. The porous particles may include, but are not limited to, molecular sieves such as CVX-7 and SSZ-13, and/or other molecular sieves having the required mesoporosity. A method for making the mixed matrix membrane is also described. Further, a method is disclosed for separating gas components from a mixture of gas components using the mixed matrix membrane with mesoporous particles.

24 Claims, 1 Drawing Sheet

Schematic of gas permeation apparatus for flat membrane films

U.S. PATENT DOCUMENTS

| Patent | Date | Inventor |
|---|---|---|
| 4,032,454 A | 6/1977 | Hoover et al. |
| 4,061,724 A | 12/1977 | Grose et al. |
| 4,208,194 A | 6/1980 | Nelson |
| 4,230,463 A | 10/1980 | Henis et al. |
| 4,261,832 A | 4/1981 | Schumacher et al. |
| 4,341,605 A | 7/1982 | Solenberger et al. |
| 4,685,940 A | 8/1987 | Soffer et al. |
| 4,690,873 A | 9/1987 | Makino et al. |
| 4,728,345 A | 3/1988 | Murphy |
| 4,740,219 A | 4/1988 | Kulprathipanja et al. |
| 4,820,681 A | 4/1989 | Chang et al. |
| 4,839,331 A | 6/1989 | Maroldo et al. |
| 4,925,459 A | 5/1990 | Rojey et al. |
| 5,071,450 A | 12/1991 | Cabrera et al. |
| 5,085,676 A | 2/1992 | Ekiner et al. |
| 5,086,033 A | 2/1992 | Armor et al. |
| 5,104,425 A | 4/1992 | Rao et al. |
| 5,104,532 A | 4/1992 | Thompson et al. |
| 5,127,925 A | 7/1992 | Kulprathipanja et al. |
| 5,234,471 A | 8/1993 | Weinberg |
| 5,288,304 A | 2/1994 | Koros et al. |
| 5,411,577 A | 5/1995 | Moreau et al. |
| 5,431,864 A | 7/1995 | Rao et al. |
| 5,649,996 A | 7/1997 | Soffer et al. |
| 5,772,735 A | 6/1998 | Sehgal et al. |
| 5,880,061 A | 3/1999 | Yoshino et al. |
| 6,004,374 A | 12/1999 | Rao et al. |
| 6,117,328 A * | 9/2000 | Sikdar et al. .................. 95/45 |
| 6,299,669 B1 | 10/2001 | Koros et al. |
| 6,503,295 B1 | 1/2003 | Koros et al. |
| 6,508,860 B1 | 1/2003 | Kulkarni et al. |
| 6,562,110 B2 | 5/2003 | Koros et al. |
| 6,626,980 B2 * | 9/2003 | Hasse et al. .................. 95/51 |
| 6,719,147 B2 * | 4/2004 | Strano et al. .................. 96/11 |
| 2002/0053284 A1 | 5/2002 | Koros et al. |
| 2002/0056369 A1 | 5/2002 | Koros et al. |
| 2003/0131731 A1* | 7/2003 | Koros et al. .................. 96/10 |

OTHER PUBLICATIONS

Paul et al., The Diffusion Time Lag in Polymer Membranes Containing Adsorptive Fillers, J. Polymer Sci.: Symposium No. 41, (1973), pp. 79-93, John Wiley & Sons, Inc.

Jia et al., Molecular Sieving Effect of the Zeolite-Filled Silicone Rubber Membranes in Gas Permeation, Journal of Membrane Science, (1991), pp. 289-296, vol. 57, Elsevier Science Publishers B.V., Amsterdam.

Costello et al., Temperature Dependence of Gas Sorption and Transport Properties in Polymers: Measurement and Applications, Ind. Eng. Chem. Res., (1992), pp. 2708-2714, vol. 31, American Chemical Society.

Suer et al., Gas Separation with Zeolite Based Polyethersulfone Membranes, Separation Technology, Process Technology Prooceedings, (1994), pp. 661-669, Elsevier Science B.V.

Koros et al., Membrane-Based Gas Separation, Journal of Membrane Science, (1993), pp. 1-80, vol. 83, Elsevier Science Publishers B.V., Amsterdam.

Duval et al., Adsorbent Filled Membranes for Gas Separation. Part 1. Improvement of the Gas Separation Properties of Polymeric Membranes by Incorporation of Microporous Adsorbents, Journal of Membrane Science, (1993), pp. 189-198, vol. 80, Elsevier Science Publishers B.V., Amsterdam.

Suer et al., Gas Permeation Characteristics of Polymer-Zeolite Mixed Matrix Membranes, Journal of Membrane Science, (1994), pp. 77-86, vol. 91, Elsevier Science B.V.

Prasad et al., Evolution of Membranes in Commercial Air Separation, Journal of Membrane Science, (1994), pp. 225-248, vol. 94, Elsevier Science B.V., Amsterdam.

Gur, Permselectivity of Zeolite Filled Polysulfone Gas Separation Membranes, Journal of Membrane Science, (1994), pp. 283-289, vol. 97, Elsevier Science B.V.

Duval et al., Preparation of Zeolite Filled Glassy Polymer Membranes, Journal of Applied Polymer Science, (1994), pp. 409-418, vol. 54, John Wiler & Sons, Inc.

Zimmerman et al., Tailoring Mixed Matrix Composite Membranes for Gas Separations, Journal of Membrane Science, (1997), pp. 145-154, vol. 137, Elsevier Science B.V.

Breck, Adsorption by Dehydrated Zeolite Crystals, Zeolite Molecular Sieves, Structure, Chemistry, and Use, pp. 593-724.

* cited by examiner

FIG. 1

Schematic of gas permeation apparatus for flat membrane films

US 7,306,647 B2

MIXED MATRIX MEMBRANE WITH MESOPOROUS PARTICLES AND METHODS FOR MAKING AND USING THE SAME

TECHNICAL FIELD

The present invention relates generally to membranes for separating fluids, and more particularly, to those membranes which include porous particles for enhancing the separating capabilities of the membranes.

BACKGROUND OF THE INVENTION

Numerous references teach using mixed matrix membranes which comprise a continuous phase polymer carrier with porous particles dispersed therein. Examples include U.S. Pat. No. 4,925,459 to Rojey et al. and U.S. Pat. No. 5,127,925 to Kulprathipanja et al. The membranes are particularly useful for separating gases from a mixture or feedstream containing at least two gas components, generally of differing effective diameters.

Membrane performance is characterized by the flux of a gas component across the membrane. This flux can be expressed as a quantity called the permeability (P), which is a pressure- and thickness-normalized flux of a given component. The separation of a gas mixture is achieved by a membrane material that permits a faster permeation rate for one component (i.e., higher permeability) over that of another component. The efficiency of the membrane in enriching one component over another component in the permeate stream can be expressed as a quantity called selectivity. Selectivity is defined as the ratio of the permeabilities of the gas components across the membrane (i.e., $P_A/P_B$, where A and B are the two components). A membrane's permeability and selectivity are material properties of the membrane material itself, and thus these properties are ideally constant with feed pressure, flow rate and other process conditions. However, permeability and selectivity are both temperature-dependent. It is desirable for membrane materials to have a high selectivity (efficiency) for the desired component, while maintaining a high permeability (productivity) for the desired component.

Under the proper conditions, the addition of porous particles may increase the relative effective permeability of a desirable gas component through the polymeric membrane (and/or decrease effective permeability of the other gas components), and thereby enhance the gas separation (selectivity) of the polymeric membrane material. If the selectivity is significantly improved, i.e., on the order of 10% or more, by incorporating porous particles into a continuous phase polymer, the mixed matrix membrane may be described as exhibiting a "mixed matrix effect". A selectivity enhancement test will be described in detail below.

This "mixed matrix membrane" concept is described in publications such as U.S. Pat. Nos. 6,503,295; 6,562,110; and 6,508,860 and U.S. Patent Publication Nos. 2002/0056369 and 2002/0053284—using porous, molecular-sieving entities to enhance separation performance. The so-called "mixed matrix effect" relies on the principle that inclusion of highly size- and shape-selective molecular sieves (such as zeolites or carbon molecular sieves) having pore dimensions that can discriminate penetrants within a polymeric matrix may substantially improve the overall selectivity of the hybrid membrane. Such enhanced selectivity may be much higher than the selectivity achievable using the neat polymer as a membrane alone.

A significant problem with using such mixed matrix membranes is the selectivity-productivity trade-off of membranes. This trade-off is encountered when optimizing membranes for maximum selectivity and maximum productivity. Generally, these two properties operate counter to each other. In other words, higher selectivity membranes generally have lower productivities while lower selectivity membranes generally offer higher productivities.

Ideally, a mixed matrix membrane will have a high permeability. This will allow membranes with a minimal amount of surface area to treat to separate a large volume of mixed gases. Economically, a more expensive polymer and/or porous particle can be used in a smaller size membrane as compared to a much larger membrane made of less expensive neat polymer or made using less expensive polymer/sieve particles which are significantly less productive. Still, the membrane should not suffer a significant loss in selectivity relative to using a membrane made of only the neat polymer.

The present invention addresses shortcomings in previous mixed matrix membranes which have sacrificed membrane productivity (permeability) in order to achieve higher levels of selectively.

SUMMARY OF THE INVENTION

The present invention includes a mixed matrix membrane for separating fluids components from a feedstream containing a mixture of gaseous components. The membrane comprises a continuous phase polymer with inorganic porous particles interspersed therein. The polymer, when in the form of a membrane made of the neat polymer, has a $CO_2/CH_4$ selectivity of at least 20. The porous particles, preferably molecular sieves, have a mesoporosity of at least 0.1 cc STP/g or even at least 0.15 cc STP/g. The permeability of this mixed matrix membrane is increased by at least 30% with any decrease in selectivity being no more than 10% relative to a membrane made of the neat polymer. In some instances both the permeability and the selectivity may be enhanced. Also, in some cases, the permeability is increased by more than 50% with any decrease in selectivity being no more than 10% relative to a membrane made of the neat polymer. Preferably, the loading of the molecular sieves in the membrane is between 10-40% by weight. The molecular sieves may be small pore molecular sieves. Preferred examples of molecular sieves are CVX-7 and SSZ-13, which of course, have the required level of relatively high mesoporosity.

A method for separating gas components from a feedstream of mixed gas components is also taught in this invention. The method comprises a first step of providing a mixed matrix membrane including a polymer having porous particles, preferably molecular sieves, interspersed therein. The membrane has feed and permeate sides. The polymer, when in the form of a membrane made of the neat polymer, has a $CO_2/CH_4$ selectivity of at least 20. The particles have a mesoporosity of at least 0.1 cc STP/g. The permeability of the mixed matrix membrane is increased by at least 30% with any decrease in selectivity being no more than 10% relative to a membrane made of the neat polymer.

A second step in separating the gas components is to direct a feedstream, including first and second gas components, to the feed side of the membrane and withdrawing a retentate stream depleted in the first gas component from the feed side and withdrawing a permeate stream enriched in the first gas component from the permeate side of the membrane. Preferred gas components to be separated include carbon dioxide and methane.

A method of making a mixed matrix membrane is also described. Inorganic porous particles, preferably molecular sieves, are mixed with a polymer in a solution. The inorganic porous particles have a mesoporosity of at least 0.1 cc STP/g and the polymer has a selectivity of at least 20. A mixed matrix membrane is formed with the porous particles interspersed in a continuous phase of the polymer. The permeability of the mixed matrix membrane is increased by at least 30% with any decrease in selectivity being not more than 10% relative to a membrane made of the neat polymer. The membrane may be made in a variety of forms including, but not limited to, flat sheets or hollow fibers.

It is an object of the present invention to provide a mixed matrix membrane which has inorganic porous particles with a relatively high level of mesoporosity to provide enhanced membrane productivity without losing significant selectivity, as compared to a similar membranes without the mesoporous particles therein or having particles with a relatively low level of mesoporosity, thereby providing more productivity per unit cost of membrane than conventional membranes.

It is another object to provide a mixed matrix membrane which utilizes a continuous phase polymer which has a high selectivity for separating gases in a mixture of gases and which further has porous particles dispersed in the polymer which provide a significant quantity of non-selective pathways through a portion of the thickness of the membrane to enhance the permeability of the mixed matrix membrane relative to a membrane made of the neat polymer.

BEST MODE(S) FOR CARRYING OUT THE INVENTION

Mixed matrix membranes, made in accordance with the present invention, include inorganic porous particles dispersed into a continuous phase polymer. The inorganic porous particles ideally have a minimum mesoporosity of at least 0.10 cubic centimeters/gram at standard temperature and pressure (cu.cm.STP/g). The membranes exhibit a significant increase in permeability without substantial losses in selectivity relative to a neat membrane of the continuous phase polymer. In some cases, both selectivity and permeability are enhanced.

In general, particles with mesopores have pores with cross-sectional dimensions on the order of 10-100 Å, which is significantly larger than the effective diameters of gases which are to be separated. These gases typically range on the order of 2.6 A-4 A. For example, carbon dioxide and methane have effective diameters of 3.3 A and 3.8 A. A quantitative test for evaluating the mesoporosity of molecular sieves will be described in greater detail below.

While not wishing to be held to a particular theory, it is believed that the presence mesopores in porous particles enhances permeability by decreasing the distance or thickness of polymer through which a gas must pass in crossing the membrane. The mesopores form a non-selective volume or passageway within the membrane through which gases can quickly pass. The membrane retains significant selectivity as the gases must still pass through the highly selective polymer carrier. Effectively, the presence of the mesopores in the particles of the membrane allows the mixed matrix membrane to have the productivity (permeability) of a thinner membrane. However, for the purposes of tensile strength, the mixed matrix membrane has a greater strength than would the thinner neat polymer membrane.

Continuous phase polymers which are highly selective and can support the porous particles will first be described. Then, exemplary inorganic porous particles to be incorporated into the continuous phase polymer will be taught. A method of making mixed matrix membranes utilizing the polymers and the porous particles will next be described. Finally, examples will be provided which show that mixed matrix membranes, made in accordance with the present invention, can be made which have relatively high permeability compared to conventional membranes without significantly sacrificing selectivity performance. In a preferred embodiment, the membranes are useful for separating a gaseous mixture containing carbon dioxide and methane.

I. Polymer Selection

An appropriately selected polymer can be used which permits passage of the desired gases to be separated, for example carbon dioxide and methane. Preferably, the polymer permits one or more of the desired gases to permeate through the polymer at different rates than other components, such that one of the individual gases, for example carbon dioxide, permeates at a faster rate than another gas, such as methane, through the polymer.

For use in making mixed matrix membranes for separating $CO_2$ and $CH_4$, the most preferred polymers include Ultem® 1000, Matrimid® 5218, 6FDA/BPDA-DAM, 6FDA-6FpDA, and 6FDA-IPDA (all polyimides). 6FDA/BPDA-DAM and 6FDA-IPDA are available from E.I. du Pont de Nemours and Company of Wilmington, Del. and are described in U.S. Pat. No. 5,234,471. Matrimid® 5218 is commercially available from Advanced Materials of Brewster, N.Y. Ultem® 1000 may be obtained commercially from General Electric Plastics of Mount Vernon, Ind.

Examples of suitable polymers include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly (vinyl acetate) and poly(vinyl propionate), poly(vinyl pyridines), poly(vinyl pyrrolidones), poly(vinyl ethers), poly(vinyl ketones), poly(vinyl aldehydes) such as poly (vinyl formal) and poly(vinyl butyral), poly(vinyl amides), poly(vinyl amines), poly(vinyl urethanes), poly(vinyl ureas), poly(vinyl phosphates), and poly(vinyl sulfates);

polyallyls; poly(benzobenzimidazole); polyhydrazides; polyoxadiazoles; polytriazoles; poly (benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like. It is preferred that the membranes exhibit a carbon dioxide/methane selectivity of at least about 20 and more preferably of at least 30 at 35° C.

Preferably, the polymer is a rigid, glassy polymer as opposed to a rubbery polymer or a flexible glassy polymer. Glassy polymers are differentiated from rubbery polymers by the rate of segmental movement of polymer chains. Polymers in the glassy state do not have the rapid molecular motions that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. The glass transition temperature ($T_g$) is the dividing point between the rubbery or glassy state. Above the $T_g$, the polymer exists in the rubbery state; below the $T_g$, the polymer exists in the glassy state. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures ($T_g$>150° C.).

In rigid, glassy polymers, the diffusion coefficient tends to dominate, and glassy membranes tend to be selective in favor of small, low-boiling molecules. The preferred membranes are made from rigid, glassy polymer materials that will pass carbon dioxide (and nitrogen) preferentially over methane and other light hydrocarbons. Such polymers are well known in the art and are described, for example, in U.S. Pat. No. 4,230,463 to Monsanto and U.S. Pat. No. 3,567,632 to DuPont. Suitable membrane materials include polyimides, polysulfones and cellulosic polymers.

II. Mesoporous Particles

The inorganic porous particles of the present invention preferably have a mesoporosity of at least 0.10 cc STP/g. For even greater permeability, the molecular sieves may have a mesoporosity of 0.15 cc STP/g or more. Mesoporosity, for the purposes of this specification, is defined as the difference between the total pore volume and the micropore volume of the porous particles. The micropore volume is determined using ASTM D4365-95. The total pore volume is the quantity of $N_2$ gas adsorbed (cu.cm.STP/g) at 0.99 $P/P_0$. The term "inorganic" shall mean that the particles are substantially free of carbon in their frameworks. Rather, the frameworks of the particles will typically depend upon silica or alumina. Mesoporous particles, for the purposes of this specification and the appended claims, shall mean particles having particles having a mesoporosity of at least 0.10 cc STP/g. Non-mesoporous particles are defined as particles having a mesoporosity of less than 0.10 cc STP/g.

The mesoporous particles may be intermediate pore size molecular sieves such as ZSM-5, such as described in U.S. Pat. No. 3,702,886, or large pore size molecular sieves, such as zeolite Y, such as described in U.S. Pat. No. 4,401,556. Alternatively, the molecular sieves may be mesoporous molecular sieves such as MCM41 which is synthesized in accordance with U.S. Pat. No. 5,098,684.

The phrase "intermediate pore size" as used herein means that the crystallographic free diameters of the channels of the molecular sieves of the present embodiments range from about 4.0-7.1 Å. Descriptions of crystallographic free diameters of the channels of molecular sieves are published, for example, in "Atlas of Zeolite Framework Types," edited by C. Baerlocher et al., Fifth Revised Edition (2001), incorporated herein by reference with respect to the crystallographic free diameters of zeolites and other like non-zeolitic molecular sieves.

The phrase "large pore size" as used herein means that the crystallographic free diameters of the channels of the molecular sieves of the present embodiments are greater than 7.1 Å.

More preferably, however, the molecular sieves are small pore molecular sieves. These sieves have pores with a crystallographic free diameter of less than 4.0 Å. The most preferable small pore molecular sieves are those with a largest minor free diameter of between 3.0-4.0 Å.

Ideally, the overall particle size of the molecular sieves will be small as well. Size refers to a number average particle size. As used herein, the symbol "µ" represents a measure of length in microns or, in the alternative, micrometers. In terms of particle size of the small particles described herein, this measure of length is a measure of the nominal or average diameters of the particles, assuming that they approximate a spherical shape, or, in the case of elongated particles the length is the particle size.

A variety of analytical methods are available to practitioners for determining the size of small particles. One such method employs a Coulter Counter, which uses a current generated by platinum electrodes on two sides of an aperture to count the number, and determine the size, of individual particles passing through the aperture. The Coulter Counter is described in more detail in J. K. Beddow, ed., Particle Characterization in Technology, Volume 1, Applications and Microanalysis, CRC Press, Inc., 1984, pp. 183-186, and in T. Allen, Particle Size Measurement, London: Chapman and Hall, 1981, pp. 392-413. A sonic sifter, which separates particles according to size by a combination of a vertical oscillating column of air and a repetitive mechanical pulse on a sieve stack, can also be used to determine the particle size distribution of particles used in the process of this invention. Sonic sifters are described in, for example, T. Allen, Particle Size Measurement, London: Chapman and Hall, 1981, pp. 175-176. The average particle size may also be determined by a laser light scattering method, using, for example, a Malvern MasterSizer instrument. An average particle size may then be computed in various well-known ways, including:

$$\text{Number Average} = \frac{\sum_{i=1}^{n}(z_i x L_i)}{\sum_{i=1}^{n} z_i}$$

wherein $z_i$ is the number of particles whose length falls within an interval $L_1$. For purposes of this invention, average particle size will be defined as a number average.

The size is ideally between 0.2-3.0 microns, more preferably between 0.2-1.5 microns, and even more preferably between 0.2-0.7 microns. Smaller particle sizes are believed to give higher membrane tensile strength. Preferably, the molecular sieves are synthesized to have a number average particle size of less than 1 micron and more preferably, less than 0.5. Although less preferred, the particle size can be reduced after synthesis such as by high shear wet milling or by ball milling.

Crystallite size, as measured by electron microscopy, is ideally between 0.03-0.5 microns, more preferably between 0.03-0.3 microns, and even more preferably between 0.03-0.2 microns. It is believed that small crystallite size within the sieve aggregate particle contributes to high mesoporosity.

Molecular sieve structure types can be identified by their structure type code as assigned by the IZA Structure Commission following the rules set up by the IUPAC Commission on Zeolite Nomenclature. Each unique framework topology is designated by a structure type code consisting of three capital letters. Preferred molecular sieves used in the present invention include molecular sieves having IZA structural designations of AEI, CHA, ERI, LEV, AFX, AFT and GIS. Exemplary compositions of such small pore molecular sieves include zeolites, non-zeolitic molecular sieves (NZMS) comprising certain aluminophosphates (AlPO's), silicoaluminophosphates (SAPO's), metallo-aluminophosphates (MeAPO's), elementaluminophosphates (EIAPO's), metallo-silicoaluminophosphates (MeAPSO's) and elementalsilicoaluminophosphates (EIAPSO's).

By way of example rather than limitation, examples of small molecular sieves which may be used in the present invention are included in Table 1 below. Table 1 includes U.S. patents and literature references which describe how the molecular sieves may be synthesized. These U.S. patents and the literature references are hereby incorporated by reference in their entireties.

The most preferred molecular sieve for use in this invention is that of CVX-7, which is a ERI structured silicoaluminophosphate molecular sieve. A more detailed description of the synthesis of the preferred CVX-7 is described below in Example 5. In general, the synthesis conditions for making mesoporous CVX-7 include the following molar ratios in the synthesis mix:

| | |
|---|---|
| $SiO_2/Al_2O_3 =$ | 0-0.2 |
| $P_2O_5/Al_2O_3 =$ | 0.7-1.2 |
| $HF/Al_2O_3 =$ | 0-2 |
| $Mg^{+2}/Al_2O_3 =$ | 0-0.1 |
| $Organic/Al_2O_3 =$ | 0.6-5.0 |
| $H_2O/Al_2O_3 =$ | 30-150 |

The preferred organic is cyclohexylamine. The preferred seeds content is 0.5-10 wt %. Synthesis temperature preferably is 175-210° C. for 12 hours at the higher temperature to 7 days at the lower temperature.

Another highly preferred sieve particle is mesoporous SSZ-13. An example of the synthesis of a mesoporous SSZ-13 is described in Example 1. Also, highly preferred sieves include SAPO-17, MeAPSO-17, SAPO-34, SAPO-44 and SAPO-47. The MeAPSO-17 molecular sieves can have, by way of example and not limitation, metal constituents including titanium, magnesium, chromium, nickel, iron, cobalt, and vanadium.

TABLE 1

Exemplary Molecular Sieves

| IZA Structure Type | Material | Major and Minor Crystallographic Free Diameters of Pores (Å) | Synthesis Described in Reference |
|---|---|---|---|
| AEI | AlPO-18 | 3.8 × 3.8 | U.S. Pat. No. 4,310,440 |
| AEI | SAPO-18 | 3.8 × 3.8 | U.S. Pat. No. 4,440,871 |
| | | | U.S. Pat. No. 5,958,370 |
| CHA | AlPO-34 | 3.8 × 3.8 | Acta Crystallogr., C50, 852-854 (1994) |
| CHA | SAPO-34 | 3.8 × 3.8 | U.S. Pat. No. 4,440,871 |
| CHA | SAPO-44 | 3.8 × 3.8 | U.S. Pat. No. 4,440,871 |
| CHA | SAPO-47 | 3.8 × 3.8 | U.S. Pat. No. 4,440,871 Pluth, J. J. & Smith, J. V. J. Phys. Chem, 93, 6516-6520 (1989) |
| ERI | AlPO-17 | 5.1 × 3.6 | U.S. Pat. No. 4,503,023 |
| ERI | SAPO-17 | 5.1 × 3.6 | U.S. Pat. No. 4,778,780 |
| | | | U.S. Pat. No. 4,440,871 |
| ERI | CVX-7 | 5.1 × 3.6 | Described below in Example 5 |
| LEV | SAPO-35 | 4.8 × 3.6 | U.S. Pat. No. 4,440,871 |
| AFX | SAPO-56 | 3.6 × 3.4 | U.S. Pat. No. 5,370,851 |
| AFT | AlPO-52 | 3.8 × 3.2 | U.S. Pat. No. 4,851,204 |
| GIS | SAPO-43 | 4.5 × 3.1 4.8 × 2.8 | U.S. Pat. No. 4,440,871 |
| MER | Zeolite W | 5.1 × 3.4 3.5 × 3.1 3.6 × 2.7 | Sherman, J. D., ACS Sym. Ser., 40, 30 (77). |
| DDR | ZSM-58 | 4.4 × 3.6 | U.S. Pat. No. 4,698,217 |
| CHA | SSZ-13 | 3.8 × 3.8 | U.S. Pat. No. 4,544,538 |
| CHA | SSZ-62 | 3.8 × 3.8 | U.S. Pat. No. 6,709,644 |

III. Methods of Forming Mixed Matrix Membrane

The molecular sieves can optionally, but preferably, be "primed" (or "sized") by adding a small amount of the desired matrix polymer or any suitable "sizing agent" that will be miscible with the organic polymer to be used for the matrix phase. Generally, this small amount of polymer or "sizing agent" is added after the molecular sieves have been dispersed in a suitable solvent and sonicated by an ultrasonic agitator source. Optionally, a non-polar non-solvent, in which the polymer or "sizing agent" is insoluble, may be added to the dilute suspension to initiate precipitation of the polymer onto the molecular sieves. The "primed" molecular sieves may be removed through filtration and dried by any conventional means, for example in a vacuum oven, prior to re-dispersion in the suitable solvent for casting. The small amount of polymer or "sizing agent" provides an initial thin coating (i.e., boundary layer) on the molecular sieve surface that will aid in making the particles compatible with the polymer matrix.

In a preferred embodiment, approximately 10% of total polymer material amount to be added for the final mixed matrix membrane is used to "prime" the molecular sieves. The slurry is agitated and mixed for preferably between about six and seven hours. After mixing, the remaining amount of polymer to be added is deposited into the slurry. The quantity of molecular sieves and the amount of polymer added will determine the "loading" (or solid particle concentration) in the final mixed matrix membrane. Without limiting the invention, the loading of molecular sieves is preferably from about 10 vol. % to about 60 vol. %, and more preferably, from about 20 vol. % to about 50 vol. %. To achieve the desired viscosity, the polymer solution concentration in the solvent is preferably from about 5 wt. % to about 25 wt. %. Finally, the slurry is again well agitated and mixed by any suitable means for about 12 hours.

This technique of "priming" the particles with a small amount of the polymer before incorporating the particles into a polymer film is believed to make the particles more compatible with the polymer film. It is also believed to promote greater affinity/adhesion between the particles and the polymers and may eliminate defects in the mixed matrix membranes.

The mixed matrix membranes are typically formed by casting the homogeneous slurry containing particles and the desired polymer, as described above. The slurry can be mixed, for example, using homogenizers and/or ultrasound to maximize the dispersion of the particles in the polymer or polymer solution. The casting process is preferably performed by three steps:

(1) pouring the solution onto a flat, horizontal surface (preferably glass surface);
(2) slowly and virtually completely evaporating the solvent from the solution to form a solid membrane; and
(3) drying the membrane.

To control the membrane thickness and area, the solution is preferably poured into a metal ring mold. Slow evaporation of the solvent is preferably effected by covering the area and restricting the flux of the evaporating solvent. Generally, evaporation takes about 12 hours to complete, but can take longer depending on the solvent used. The solid membrane is preferably removed from the flat surface and placed in a vacuum oven to dry. The temperature of the vacuum oven is preferably set from about 50° C. to about 110° C. (or about 50° C. above the normal boiling point of the solvent) to remove remaining solvent and to anneal the final mixed matrix membrane.

The final, dried mixed matrix membrane can be further annealed above its glass transition temperature ($T_g$). The $T_g$ of the mixed matrix membrane can be determined by any suitable method (e.g., differential scanning calorimetry). The mixed matrix film can be secured on a flat surface and placed in a high temperature vacuum oven. The pressure in the vacuum oven (e.g., Thermcraft® furnace tube) is preferably between about 0.01 mm Hg to about 0.10 mm Hg. Preferably, the system is evacuated until the pressure is 0.05 mm Hg or lower. A heating protocol is programmed so that the temperature reaches the $T_g$ of the mixed matrix membrane preferably in about two to three hours. The temperature is then raised to preferably about 10° C. to about 30° C., but most preferably about 20° C., above the $T_g$ and maintained at that temperature for about 30 minutes to about two hours. After the heating cycle is complete, the mixed matrix membrane is allowed to cool to ambient temperature under vacuum.

The resulting mixed matrix membrane is an effective membrane material for separation of one or more gaseous components from gaseous mixtures including the desired component(s) and other components. In a non-limiting example of use, the resulting membrane has the ability to separate carbon dioxide from methane, is permeable to these substances, and has adequate strength, heat resistance, durability and solvent resistance to be used in commercial purifications.

IV. Separation Systems Including the Membranes

The membranes may take any form known in the art, for example hollow fibers, tubular shapes, and other membrane shapes. Some other membrane shapes include spiral wound, pleated, flat sheet, or polygonal tubes. Multiple hollow fiber membrane tubes can be preferred for their relatively large fluid contact area. The contact area may be further increased by adding additional tubes or tube contours. Contact may also be increased by altering the gaseous flow by increasing fluid turbulence or swirling.

For flat-sheet membranes, the thickness of the mixed matrix selective layer is between about 0.001 and 0.005 inches, preferably about 0.002 inches. In asymmetric hollow fiber form, the thickness of the mixed matrix selective skin layer is preferably about 1,000 Å to about 5,000 Å. The loading of molecular sieves in the continuous polymer phase is between about 10% and 60%, and more preferably about 20% to 50% by volume.

The preferred glassy materials that provide good gas selectivity, for example carbon dioxide/methane selectivity, tend to have relatively low permeabilities. A preferred form for the membranes is, therefore, integrally skinned or composite asymmetric hollow fibers, which can provide both a very thin selective skin layer and a high packing density, to facilitate use of large membrane areas. Hollow tubes can also be used.

Sheets can be used to fabricate a flat stack permeator that includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are hereby incorporated by reference.

The membranes can be included in a separation system that includes an outer perforated shell surrounding one or more inner tubes that contain the mixed matrix membranes. The shell and the inner tubes can be surrounded with packing to isolate a contaminant collection zone.

In one mode of operation, a gaseous mixture enters the separation system via a containment collection zone through the perforations in the outer perforated shell. The gaseous mixture passes upward through the inner tubes. As the gaseous mixture passes through the inner tubes, one or more components of the mixture permeate out of the inner tubes through the selective membrane and enter the containment collection zone.

The membranes can be included in a cartridge and used for permeating contaminants from a gaseous mixture. The contaminants can permeate out through the membrane, while the desired components continue out the top of the membrane. The membranes may be stacked within a perforated tube to form the inner tubes or may be interconnected to form a self-supporting tube. Each of the stacked membrane elements may be designed to permeate one or more components of the gaseous mixture. For example, one membrane may be designed for removing carbon dioxide, a second for removing hydrogen sulfide, and a third for removing nitrogen. The membranes may be stacked in different arrangements to remove various components from the gaseous mixture in different orders.

Different components may be removed into a single contaminant collection zone and disposed of together, or they may be removed into different zones. The membranes may be arranged in series or parallel configurations or in combinations thereof depending on the particular application.

The membranes may be removable and replaceable by conventional retrieval technology such as wire line, coil tubing, or pumping. In addition to replacement, the membrane elements may be cleaned in place by pumping gas, liquid, detergent, or other material past the membrane to remove materials accumulated on the membrane surface.

A gas separation system including the membranes described herein may be of a variable length depending on the particular application. The gaseous mixture can flow through the membrane(s) following an inside-out flow path where the mixture flows into the inside of the tube(s) of the membranes and the components which are removed permeate out through the tube. Alternatively, the gaseous mixture can flow through the membrane following an outside-in flow path.

In order to prevent or reduce possibly damaging contact between liquid or particulate contaminates and the membranes, the flowing gaseous mixture may be caused to rotate or swirl within an outer tube. This rotation may be achieved in any known manner, for example using one or more spiral deflectors. A vent may also be provided for removing and/or sampling components removed from the gaseous mixture.

V. Purification Process

A mixture containing gases to be separated, for example carbon dioxide and methane, can be enriched by a gas-phase process through the mixed matrix membrane, for example, in any of the above-configurations.

The preferred conditions for enriching the mixture involve using a temperature between about 25° C. and 200° C. and a pressure of between about 50 psia and 5,000 psia. These conditions can be varied using routine experimentation depending on the feedstreams.

Other gas mixtures can be purified with the mixed matrix membrane in any of the above configurations. For example, applications include enrichment of air by nitrogen or oxygen, nitrogen or hydrogen removal from methane streams, or carbon monoxide from syngas streams. The mixed matrix membrane can also be used in hydrogen separation from refinery streams and other process streams, for example from the dehydrogenation reaction effluent in the catalytic dehydrogenation of paraffins. Generally, the mixed matrix membrane may be used in any separation process with gas mixtures involving, for example, hydrogen, nitrogen, methane, carbon dioxide, carbon monoxide, helium, and oxygen. Also, the membranes can be used to separate ethylene from ethane and propylene from propane. The gases that can be separated are those with kinetic diameters that allow passage through the molecular sieves. The kinetic diameter (also referred to herein as "molecular size") of gas molecules are well known, and the kinetic diameters of voids in molecular sieves are also well known, and are described, for example, in D. W. Breck, Zeolite Molecular Sieves, Wiley (1974), the contents of which are hereby incorporated by reference.

VI. Membrane Evaluation

Permeability measurements of the flat mixed matrix membranes can be made using a manometric, or constant volume, method. The apparatus for performing permeation measurements on dense, flat polymeric films are described in O'Brien et al., *J. Membrane Sci.*, 29, 229 (1986) and Costello et al., *Ind. Eng. Chem. Res.*, 31, 2708 (1992), the contents of which are hereby incorporated by reference. The permeation system includes a thermostated chamber containing two receiver volumes for the upstream and downstream, a membrane cell, a MKS Baratron® absolute pressure transducer (0-10 torr or 0-100 torr range) for the downstream, an analog or digital high pressure gauge (0-1000 psia) for the upstream, welded stainless steel tubing, Nupro® bellows seal valves, and Cajon VCR® metal face seal connections. The chamber temperature can be regulated for permeation measurements ranging from 25° C. to 75° C.

Figure 1:
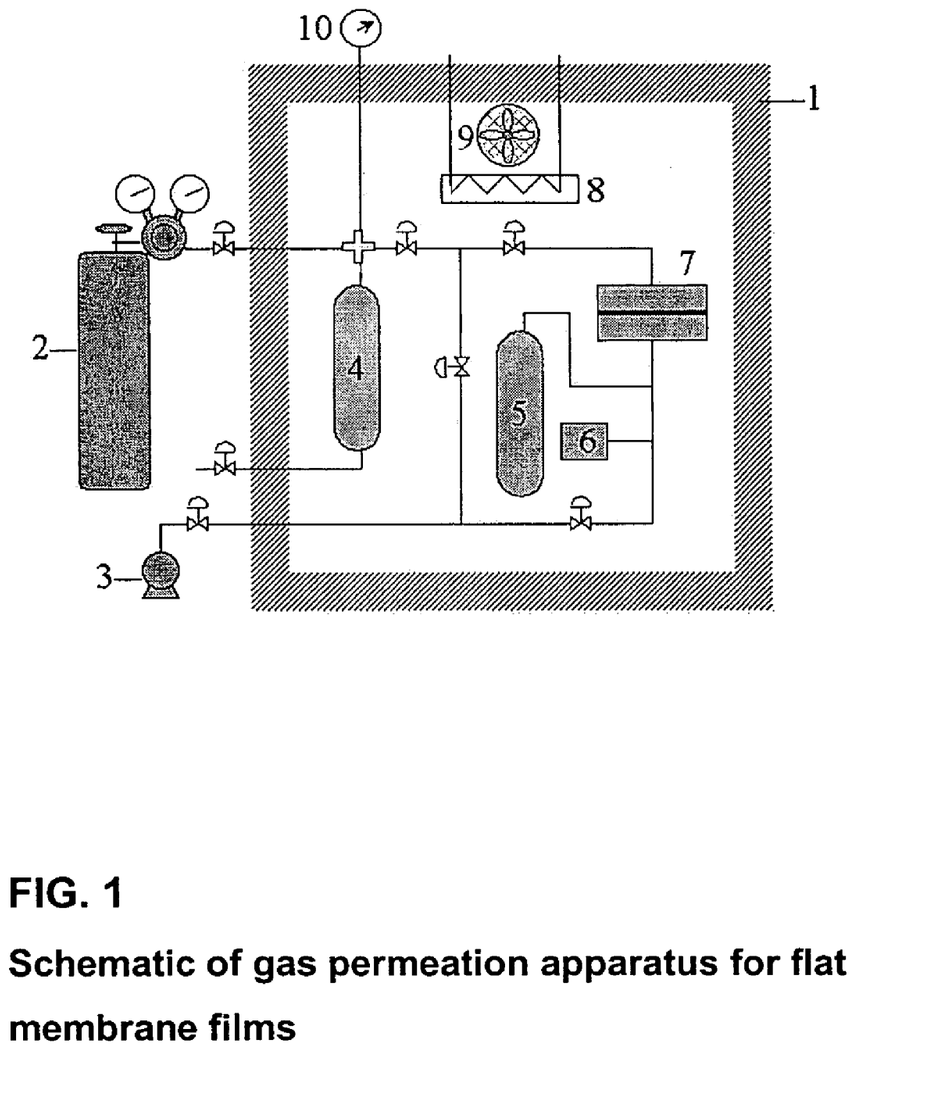
FIG. 1 is a schematic drawing of a separation system used to test the permeability and selectivity of a particular membrane.

The schematic of the permeation testing apparatus is shown in FIG. 1, where 1 is a heated chamber, 2 is a supply gas cylinder, 3 is a vacuum pump, 4 is the feed receiver volume, 5 is the permeate receiver volume, 6 is a pressure transducer, 7 is a membrane cell, 8 is a thermostat-controlled heater, 9 is a fan and 10 is a pressure gauge.

Flat membranes can be masked with adhesive aluminum masks having a circular, pre-cut, exposed area for permeation through the membrane. Application of five minute epoxy at the interface between membrane and the aluminum mask is also used to prevent non-selective gas flow between the aluminum mask adhesive and membrane. Membrane thickness (by high-resolution micrometer) and membrane permeation surface area (by image scanning and area-calculating software) are measured.

After drying the epoxy for approximately 12 to about 24 hours, the masked membrane can be placed in a permeation cell and the permeation system. Both the upstream and downstream sections of the permeation system are evacuated for about 24 hours to 48 hours to remove ("degas") any gases or vapors sorbed into the membrane. Permeation tests of the membrane can be performed by pressurizing the upstream with the desired gas (pure gas or gas mixture) at the desired pressure. The permeation rate can be measured from the pressure rise of the MKS Baratron® absolute pressure transducer over time and using the known downstream (permeate) volume. The pressure rise data are logged by high-precision data acquisition hardware/software (or alternatively, plotted on a speed-regulated strip chart recorder). When testing gas mixture feeds, the permeate stream is analyzed by gas chromatography to determine composition. Following the permeation testing of a given gas, both the upstream and downstream sections were evacuated overnight before permeation testing of the next gas.

A test can be prepared to verify that the molecular sieves have been properly and successfully made to produce mixed matrix membranes with enhanced permeation properties. This test involves preparation of a sample mixed matrix membrane using a test polymer and a specified loading of molecular sieve particles, and comparing the $CO_2/CH_4$ permeation selectivity versus a membrane of the same test polymer without added sieves, i.e. a membrane made of the neat polymer. This test is performed at 35° C. and at a pressure differential of 50 psia across the membrane made of the neat polymer. The $CO_2/CH_4$ permeation selectivity is determined by taking the ratio of the permeability of $CO_2$ over that of $CH_4$. The permeability of a gas penetrant "i" is a pressure- and thickness-normalized flux of the component through the membrane and is defined by the expression:

$$P_i = \frac{N_i \cdot l}{\Delta_{p_i}}$$

where $P_i$ is permeability of component i, l is thickness of the membrane layer, $N_i$ is component i's flux (volumetric flow rate per unit membrane area) through the membrane, and $\Delta_{p_i}$ is the partial pressure driving force of component i (partial pressure difference between the upstream to the downstream). Permeability is often expressed in the customary unit of Barrer (1 Barrer=$10^{-10}$ cm$^3$ (STP)·cm/cm$^2$·s·cm Hg). Permeability measurements can be made using a manometric, or constant volume, method. The apparatus for performing permeation measurements in films are described in O'Brien et al., *J. Membrane Sci.*, 29, 229 (1986) and Costello et al., *Ind. Eng. Chem. Res.*, 31, 2708 (1992), the contents of which are hereby incorporated by reference.

Permeation tests of pure gases of $CO_2$ and $CH_4$, or gas mixture (e.g., 10% $CO_2$/90% $CH_4$) are performed on the mixed matrix membrane. The mixed matrix membrane is separately tested with each gas using an upstream pressure of about 50 psia and a vacuum downstream. A temperature of about 35° C. is maintained inside the permeation system. Similar permeation tests of pure gases of $CO_2$ and $CH_4$ or gas mixture (e.g., 10% $CO_2$/90% $CH_4$) are performed on a prepared membrane of the same test polymer without added sieve particles. To confirm that the molecular sieve particles have been properly produced and prepared by the methods described herein, the mixed matrix membrane should exhibit a $CO_2/CH_4$ permeability enhancement of 30% or more over the $CO_2/CH_4$ permeability test polymer membrane alone and with any decrease in selectivity being no more than 10% relative to the membrane made of the neat polymer.

While the above tests are performed in terms of $CO_2$ and $CH_4$ permeability and selectivity for a mixed matrix membrane, the present invention encompasses using mixed matrix membranes utilizing mesoporous particles for any fluid separation.

VII. EXAMPLES

Example 1

Synthesis of Mesoporous SSZ-13 Particles

SSZ-13 particles with high mesoporosity were prepared according to U.S. Pat. No. 4,544,538 using N,N,N-trimethyl-1-adamantammonium cation as the crystallization template or structure directing agent. The silica source was HiSil 233 (PPG) and the alumina source Reheis F-2000. Reagent molar ratios were:

| | |
|---|---|
| $SiO_2/Al_2O_3$ = | 37 |
| $OH^-/SiO_2$ = | 0.38 |
| $Na^+/SiO_2$ = | 0.20 |
| $Organic/SiO_2$ = = | 0.18 |
| $H_2O/SiO_2$ = | 17 |

The crystallization was carried out with stirring at 160° C. for 6 days. The product, after filtering, washing, and calcining had a total pore volume of 0.494 cc STP/g, a micropore volume of 0.295 cc STP/g and a mesopore volume of 0.199 cc STP/g. Micropore analysis was performed according to ASTM D4365-95, and "mesopore volume" is defined as the difference between the total pore volume and the micropore volume.

Comparative Example A

Synthesis of Non-Mesoporous SSZ-13 Particles

Another SSZ-13 was made similar to that of the Example 1 at the following reagent molar ratios:

| | |
|---|---|
| $SiO_2/Al_2O_3$ = | 39 |
| $OH^-/SiO_2$ = | 0.41 |
| $Na^+/SiO_2$ = | 0.21 |
| $Organic/SiO_2$ = = | 0.21 |
| $H_2O/SiO_2$ = | 50 |

In this case the $SiO_2$ source was Cab-o-Sil M-5 (Cabot). The crystallization was carried out with stirring at 160° C. for 6 days. The product, after filtering, washing, and calcining had a total pore volume of 0.372 cc STP/g, a micropore volume of 0.299 cc STP/g and a mesopore volume of 0.073 cc STP/g. Micropore analysis was performed according to ASTM D4365-95, and "mesopore volume" is defined as the difference between the total pore volume and the micropore volume.

Example 2

Preparation of a Mixed Matrix Membrane

A mixed matrix membrane was prepared using SSZ-13 zeolite particles as the dispersed phase. Prior to dispersal in polymer, the SSZ-13 zeolite particles were first surface-modified with a silane coupling agent. The silane coupling agent used was 3-aminopropyldimethylethoxysilane (APDMES) and has the following chemical structure:

The silanation procedure was performed as follows. A 200 mL solution was prepared with 95:5 ratio (by volume) of isopropyl alcohol (ACS certified grade) and distilled water. In a separate 500 mL container, 4.0 grams of the silane coupling agent (3-aminopropyldimethylethoxysilane or APDMES) was added to 2 grams of SSZ-13 zeolite. The isopropanol solution prepared in the first step was added to this 500 mL container to form a slurry. The SSZ-13/APDMES/isopropanol/water slurry was sonicated with an ultrasonic horn (Sonics and Materials) in five minute intervals (5 minutes sonication followed by 5 minutes of resting) for a total time of 30 minutes sonication/30 minutes resting. After sonication, the slurry was centrifuged at a high velocity (~9000 rpm) for one hour, leaving precipitated solids at the bottom and an isopropanol/water liquid mixture on top. Once the centrifuging was completed, the isopropanol/water liquid was decanted, leaving behind precipitated solid (APDMES-silanated SSZ-13) at the bottom. 100 mL of fresh isopropanol was added to the precipitated solid forming a slurry which was sonicated for one hour according to the third step above (30 minutes sonication/30 minutes resting.) After sonication, the slurry was centrifuged at high velocity (~9,000 rpm) for one hour, leaving precipitated solids (APDMES-silanated SSZ-13) at the bottom and isopropanol liquid on top. The above centrifugation procedure was repeated with two additional aliquots of isopropanol. The APDMES-silanated SSZ-13 particles were scraped from the container onto an aluminum foil-lined Petri dish and dried in a vacuum oven for overnight at 150° C. The sieves were set aside until ready to incorporate into a film.

The mixed matrix membrane comprising 18 wt. % APDMES-silanated SSZ-13 sieves in an Ultem® 1000 polymer matrix was formed in the following steps. A total of 0.250 grams of the APDMES-silanated SSZ-13 particles (prepared from the silanation above) were added to a 40 mL vial containing about 5 mL of $CH_2Cl_2$ solvent. The particles in the slurry were sonicated for about two minutes with a high-intensity ultrasonic horn (VibraCell™, Sonics & Materials, Inc.) in the vial. The slurry was well agitated and mixed for about one hour on a mechanical shaker. A total of 0.125 grams of the dried Ultem® 1000 polymer was added to the slurry in the vial. The vial was well mixed for about two hours on a mechanical shaker. Next, 1.00 grams of dried Ultem® 1000 polymer was added to the slurry solution to form a solution with 18 wt. % loading of APDMES-silanated SSZ-13 particles. The vial was well mixed again for about 16 hours on a mechanical shaker. An enclosable plastic glove bag (Instruments for Research and Industry®, Cheltenham, Pa.) was set up and near-saturated with about 200 mL of $CH_2Cl_2$ solvent. The Ultem/APDMES-silanated SSZ-13 slurry solution was poured onto a flat, clean, horizontal, leveled glass surface placed inside the plastic glove bag. The near-saturated environment slows down the evaporation of $CH_2Cl_2$.

A casting/doctor blade was used to draw down or "cast" the solution, forming a uniform-thickness wet film. The resulting liquid film was covered with an inverted glass cover dish to further slow evaporation and to prevent contact with dust, etc. The $CH_2Cl_2$ solvent from the polymer film slowly evaporated over about a 12-hour time period. The dried film, measuring about 35 microns in thickness, was removed from the glass substrate. The resulting mixed matrix membrane was dried for about 12 hours in a vacuum oven at 150° C.

Example 3

Preparation of a Mixed Matrix Membrane Using Mesoporous SSZ-13 Particles

A mixed matrix membrane was prepared with the mesoporous SSZ-13 particles prepared from Example 1. These mesoporous SSZ-13 particles were first silanated with APDMES prior to dispersal into the Ultem® 1000 polymer matrix phase, as described by Example 2. The mixed matrix membrane contained 18 wt. % APDMES-silanated mesoporous SSZ-13 particles within the Ultem® 1000 matrix and was prepared in same manner as Example 2.

Comparative Example B

Preparation of an Ultem Mixed Matrix Membrane Using Non-Mesoporous SSZ-13 Particles A mixed matrix membrane was prepared with the non-mesoporous SSZ-13 particles prepared from Comparative Example A. These non-mesoporous SSZ-13 particles were first silanated with APDMES prior to dispersal into the Ultem® 1000 polymer matrix phase, as described by Example 2. The mixed matrix membrane contained 18 wt. % APDMES-silanated non-mesoporous SSZ-13 particles within the Ultem® 1000 matrix and was prepared in same manner as Example 2.

Comparative Example C

Preparation of a Neat Polymer Membrane of Ultem® 1000

Ultem® 1000 is a polyetherimide and is commercially available from General Electric Plastics of Mount Vernon, Ind. Its chemical structure is shown below:

A neat Ultem® 1000 membrane was formed via solution casting. Ultem® 1000 was first dried in a vacuum oven at 110° C. for overnight. Next, 0.55 grams of the dried Ultem® 1000 polymer were added to 5 mL of $CH_2Cl_2$ solvent in a 40 mL vial. The vial was well-agitated and mixed on a mechanical shaker for about 1 hour to ensure that polymer was dissolved in solution. The polymer solution was poured onto a flat, clean, horizontal, leveled glass surface placed inside a controlled environment (e.g., plastic glove bag). A casting/doctor blade was used to draw down or "cast" the solution, forming a uniform-thickness wet film. The liquid film was covered with an inverted glass cover dish to slow evaporation and to prevent contact with dust, etc. The solvent from the polymer film slowly evaporated over about a 12-hour time period. The dried film, measuring about 30 microns in thickness, was removed from the glass substrate. The resulting neat Ultem® 1000 membrane was dried for about 12 hours in a vacuum oven at 150° C.

The permeation properties of the neat polymer membrane of Ultem® 1000 were determined using the apparatus and procedure described in the previous "Membrane Evaluation" section. A gas mixture containing 10% $CO_2$/90% $CH_4$ was used as the feed gas during the permeation testing. The upstream or feed side of the neat Ultem® 1000 film was exposed to this gas mixture at a pressure of 50 psia. The downstream or permeate side of the neat Ultem® 1000 membrane was maintained at a vacuum, resulting in a differential pressure driving force of 50 psia across the neat Ultem® 1000 membrane. With the permeation system maintained at a constant temperature of 35° C., the permeation rate of gases through the membrane was measured with a pressure-rise method and the composition of the permeate gas was analyzed with gas chromatography (HP 6890). Results are shown in Table 2 with the individual gas permeabilities and overall selectivity between the gases.

TABLE 2

Neat Ultem ® 1000 Membrane

| Gas Component | Permeability ($10^{-10}$ cm$^3$ (STP) · cm/cm$^2$ · s · cm Hg) | Selectivity |
|---|---|---|
| $CH_4$ | 0.038 | $CO_2/CH_4$ = 39.2 |
| $CO_2$ | 1.49 | |

From the permeability values in Table 2, the permeability ratios (selectivity) of the neat Ultem® 1000 membrane for $CO_2/CH_4$ at 35° C. was 39.2.

Example 4

Permeation Tests of Mixed Matrix Membranes Using Mesoporous and Non-Mesoporous SSZ-13 Particles Sample coupon sections from the Ultem® 1000-SSZ-13 mixed matrix films (18 wt. % SSZ-13) from Example 3 and Comparative Example B were evaluated by permeation tests. Example 3 employed APDMES-silanated mesoporous SSZ-13 zeolite particles, whereas Comparative Example B employed APDMES-silanated non-mesoporous SSZ-13 zeolite particles. Coupon sections from each Example were cut to an appropriate size and dimension and used in a permeation testing cell (as described in the "Membrane Evaluation" section) to measure the permeabilities and separation factor for a mixed gas mixture containing 10% $CO_2$/90% $CH_4$. The upstream side of the Ultem® 1000-SSZ-13 mixed matrix membrane was exposed to this gas mixture at a pressure of 50 psia. The downstream side of the Ultem® 1000-SSZ-13 mixed matrix membrane was maintained at a vacuum, resulting in differential pressure driving force of 50 psia across the Ultem® 1000-SSZ-13 mixed matrix membrane. With the permeation system maintained at a constant temperature of 35° C., the permeation rate of gases through the membrane was measured with a pressure-rise method and the composition of the permeate gas was analyzed with gas chromatography (HP 6890). Results are shown in Table 3, showing $CO_2$ gas permeabilities and the overall $CO_2/CH_4$ selectivity for these Ultem® 1000-SSZ-13 mixed matrix membranes. The data are compared to those evaluated from the neat Ultem® 1000 membrane from Comparative Example C.

TABLE 3

Ultem ® 1000-SSZ13 Mixed Matrix Membranes (Mesoporous versus Non-mesoporous SSZ-13)

| Membrane | $CO_2$ Permeability ($10^{-10}$ cm³ (STP) · cm/cm² · s · cm Hg) | Selectivity $CO_2/CH_4$ | Mesopore Volume of SSZ-13 Sieve Used (cc STP/g) |
|---|---|---|---|
| Neat Ultem ® 1000 (Comparative Example C) | 1.49 | 39.2 | — |
| Ultem ® 1000-SSZ13 (Mesoporous SSZ-13, 18 wt. %) Mixed Matrix Membrane (Example 3) | 5.01 | 46.8 | 0.199 |
| Ultem ® 1000-SSZ13 (Non-Mesoporous SSZ-13, 18 wt. %) Mixed Matrix Membrane (Comparative Example B) | 1.67 | 38.7 | 0.073 |

The Ultem® 1000-SSZ-13 (employing mesoporous SSZ-13) mixed matrix membrane exhibit $CO_2/CH_4$ selectivity that was 20% higher and $CO_2$ permeability that was 236% higher than such corresponding values in the neat Ultem® film of Comparative Example C. Thus, this mixed matrix membrane exhibits a mixed matrix effect. Addition of these APDMES-silanated mesoporous SSZ-13 zeolite particles provided beneficial performance enhancement to the mixed matrix membrane over the neat polymer membrane.

In contrast, the permeability ratios (selectivity) of the Ultem® 1000-SSZ-13 mixed matrix membrane (employing non-mesoporous SSZ-13 particles) for $CO_2/CH_4$ is 38.7. A mixed matrix effect or selectivity enhancement is not observed for this mixed matrix membrane, as this $CO_2/CH_4$ selectivity has not increased over that measured ($CO_2/CH_4$ selectivity of 39.2) for the neat Ultem® 1000 polymer membrane, which was examined in Comparative Example C. Further, the $CO_2$ permeability for this Ultem® 1000-SSZ-13 mixed matrix membrane is only 12% higher than the corresponding $CO_2$ permeability in the neat Ultem® film of Comparative Example C. These performance results are in contrast to the enhanced separation performance of the Ultem® 1000-SSZ-13 mixed matrix membrane employing mesoporous SSZ-13 particles (Example 3).

Thus, addition of high mesoporosity (defined as greater than 0.1 cc STP/g) sieve particles provides beneficial and substantial permeability enhancement to the mixed matrix membrane over a membrane made of the neat polymer. Further, the increase in permeability or productivity is significantly higher than that of the membrane incorporating the "low" mesoporosity sieve particles.

Example 5

Synthesis of Mesoporous CVX-7 Particles

The silicoaluminophosphate molecular sieve, CVX-7, with ERI framework structure was synthesized according to the following procedure. Initially, 634 grams of aluminum isopropoxide (Chattem Chemical, Inc), ground to 100(US) mesh, were added to 1,600 grams of de-ionized water with vigorous agitation. This mixture was stirred for two hours. Next, 352 grams of Orthophosphoric acid (85 wt. % in water, EMS) were slowly added to the aluminum isopropoxide/water mixture with intense agitation. The resulting mixture was blended vigorously for 30 minutes.

In the next step, 31.2 grams of Colloidal silica, LUDOX AS-30 (Du Pont), were added to the mixture with agitation followed by 64.8 grams of 48 wt. % Hydrofluoric acid, (Baker). The resulting mixture was stirred for one hour. Finally, 155 grams of cyclohexylamine, (Aldrich) were added to the mixture followed by stirring for 30 minutes. The preparation was seeded with 7 grams of as-made SAPO-17. This material was made according to U.S. Pat. No. 4,440,871. The pH of the final mixture was 4.8. 2,000 grams of the mixture were transferred into a one gallon stainless steel liner and the liner was placed into a stirred reactor. The material was synthesized at 200° C. with 150 rpm stirring over 42 hours.

The pH of the product mixture was 7.1. The product was separated from its mother-liquor by vacuum filtration followed by washing with 1.5 gallon of HCl/Methanol solution (1 part of methanol to 5 parts of 0.05 M HCl) and rinsed with two gallons of water. The product was dried at room temperature overnight. Thereafter, the product was calcined with the temperature being ramped from room temperature to 630° C. at 1° C./minute. The mixture was held at 630° C. for six hours and then allowed to cool to room temperature. The PXRD pattern of the resulting product was of Erionite-type material. The product had a silica-to-alumina molar ratio of 0.1, as measured by ICP bulk elemental analysis.

Micropore analysis (ASTM D4365-95) was performed on the CVX-7 zeolite particles from this batch. Results are shown in Table 4.

TABLE 4

Micropore Analysis (ASTM D4365-95) of CVX-7

|  | CVX-7 | Mesopore Volume (cc STP/g) |
|---|---|---|
| Micropore Volume (cc STP/g) | 0.199 | 0.105 |
| Total Pore Volume (cc STP/g) | 0.304 | |

The CVX-7 particles from this batch exhibit high degree (defined as greater than 0.1 cc STP/g) of mesoporosity.

Example 6

Preparation of a Mixed Matrix Membrane Using Mesoporous CVX-7 Particles

A mixed matrix membrane was prepared using the mesoporous CVX-7 particles, as synthesized from Example 5, as the disperse phase. As before, Ultem® 1000, as described in Comparative Example C, was used as the polymer continuous matrix phase in the mixed matrix membrane. The mixed matrix membrane containing 18 wt. % CVX-7 particles within the Ultem® 1000 matrix was prepared. However, these CVX-7 sieve particles, which have a relatively low silica-to-alumina molar ratio (0.1), were non-silanated; hence, they did not require silane coupling agents to achieve the significant mixed matrix effect. They were used "as synthesized" with no further surface-modification of any silane coupling agent. In contrast, SSZ-13 sieves, which have a high silica-to-alumina ratio, did not provide a satisfactory mixed matrix effect without silanation.

The Ultem® 1000-CVX-7 mixed matrix membrane was formed in the following steps. Initially, 0.250 grams of the non-silanated CVX-7 particles were added to a 40 mL vial containing about 5 mL of $CH_2Cl_2$ solvent to create a slurry. The particles in the slurry were sonicated for about two minutes with a high-intensity ultrasonic horn (VibraCell™, Sonics & Materials, Inc.) in the vial. The slurry was well agitated and mixed for about one hour on a mechanical shaker. 0.160 grams of the dried Ultem® 1000 polymer was added to the slurry in the vial. The vial was then well mixed for about two hours on a mechanical shaker. 1.003 grams of dried Ultem® 1000 polymer was added to the slurry solution to form a solution with 18 wt. % loading of non-silanated CVX-7 particles. The vial was well mixed again for about 16 hours on a mechanical shaker. An enclosable plastic glove bag (Instruments for Research and Industry®, Cheltenham, Pa.) was setup and near-saturated with about 200 mL of $CH_2Cl_2$ solvent.

The Ultem/non-silanated CVX-7 slurry solution was poured onto a flat, clean, horizontal, leveled glass surface placed inside the plastic glove bag. The near-saturated environment slows down the evaporation of $CH_2Cl_2$. A casting/doctor blade was used to draw down or "cast" the solution, forming a uniform-thickness wet film. The resulting liquid film was covered with an inverted glass cover dish to further slow evaporation and to prevent contact with dust, etc. The $CH_2Cl_2$ solvent from the polymer film slowly evaporated over about a 12-hour time period. The dried film, measuring about 35 microns in thickness, was removed from the glass substrate. The resulting mixed matrix membrane was dried for about 12 hours in a vacuum oven at 150° C.

Example 7

Permeation Tests of Mixed Matrix Membranes Using Mesoporous CVX-7 Particles

A sample coupon section from the Ultem® 1000-CVX7 mixed matrix film (18 wt. % mesoporous CVX-7) from Example 6 were evaluated by permeation tests. The coupon section was cut to an appropriate size and dimension and used in a permeation testing cell (as described in the "Membrane Evaluation" section) to measure the permeabilities and separation factor for a mixed gas mixture containing 10% $CO_2$/90% $CH_4$. The upstream side of the Ultem® 1000-CVX7 mixed matrix membrane was exposed to this gas mixture at a pressure of 50 psia. The downstream side of the mixed matrix membrane was maintained at a vacuum, resulting in differential pressure driving force of 50 psia across the mixed matrix membrane. With the permeation system maintained at a constant temperature of 35° C., the permeation rate of gases through the membrane was measured with a pressure-rise method and the composition of the permeate gas was analyzed with gas chromatography (HP 6890). Results are shown in Table 5, showing $CO_2$ gas permeabilities and the overall $CO_2/CH_4$ selectivity for these mixed matrix membranes. The data are compared to those evaluated from the neat Ultem® 1000 membrane from Comparative Example C.

TABLE 5

Ultem ® 1000-CVX7 (mesoporous CVX) Mixed Matrix Membrane

| Membrane | $CO_2$ Permeability ($10^{-10}$ $cm^3$ (STP) · cm/$cm^2$ · s · cm Hg) | Selectivity $CO_2/CH_4$ | Mesopore Volume of CVX-7 Sieve Used cc STP/g |
|---|---|---|---|
| Neat Ultem ® 1000 (Comparative Example C) | 1.49 | 39.2 | — |
| Ultem ® 1000-CVX7 (Mesoporous CVX-7 particles, 18 wt. %) Mixed Matrix Membrane (Example 6) | 3.08 | 62.9 | 0.105 |

The permeability ratio (selectivity) of the Ultem® 1000-CVX-7 mixed matrix membrane for $CO_2/CH_4$ was 62.9. Both the $CO_2/CH_4$ selectivity and $CO_2$ permeability of the Ultem® 1000-CVX-7 mixed matrix membrane were enhanced over those measured for the neat Ultem® 1000 film, which was examined in Comparative Example C. Thus, this mixed matrix membrane exhibits a mixed matrix effect. For this Ultem® 1000-CVX-7 mixed matrix membrane containing 18 wt. % mesoporous CVX-7 particles, the $CO_2/CH_4$ selectivity is 60% higher and the $CO_2$ permeability was 107% higher than such corresponding values in the neat Ultem® 1000 film. Addition of these non-silanated mesoporous CVX-7 particles provided beneficial performance enhancement to the mixed matrix membrane over the neat membrane. Thus, addition of high mesoporosity (defined as greater than 0.1 cc STP/g) sieve particles provides beneficial and substantial permeability enhancement to the mixed matrix membrane over the neat membrane compared to addition of sieve particles possessing low mesoporosity.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. For example, while examples are described for $CO_2$ and $CH_4$ gas separation, the present invention encompasses mixed matrix membranes and methods of making and using mixed matrix membranes containing mesoporous particles for any fluid separation.

What is claimed is:

1. A mixed matrix membrane for separating fluids comprising:
   a continuous phase polymer with inorganic molecular sieves interspersed therein, the polymer having a $CO_2$/$CH_4$ selectivity of at least 20 and the molecular sieves having a mesoporosity of at least 0.1 cc STP/g wherein;
   the $CO_2$ permeability of the mixed matrix membrane is increased by at least 30% with any decrease in selectivity being no more than 10% relative to a membrane made of the neat polymer.

2. The membrane of claim 1 wherein: the molecular sieves have a mesoporosity of at least 0.15 cc STP/g.

3. The membrane of claim 1 wherein: the permeability is increased by at least 50% with any decrease in selectivity being no more than 10% relative to a membrane made of the neat polymer.

4. The membrane of claim 1 wherein: the polymer has a $CO_2$/$CH_4$ selectivity of at least 30.

5. The membrane of claim 1 wherein: the loading of the molecular sieves in the membrane is between 20-50% by volume.

6. The membrane of claim 1 wherein: the polymer is selected from the group comprising substituted and unsubstituted polymers.

7. The membrane of claim 1 wherein: the continuous phase polymer is selected from the group consisting of polyetherimides, polyimides, 6FDA/BPDA-DAM, 6FDA-6FpDA, and 6FDA-IPDA.

8. The membrane of claim 1 wherein: the molecular sieves are selected from the group consisting of CVX-7 and SSZ-13.

9. The membrane of claim 1 wherein: the molecular sieves are selected from at least one of an aluminophosphate (AlPO), a silicoaluminophosphate (SAPO), a metallo-aluminophosphate (MeAPO), an elementaluminophosphate (ElAPO), a metal silicoaluminophosphate (MeAPSO) and an e lementalsilicoaluminophosphate (ELAPSO).

10. The membrane of claim 1 wherein: the molecular sieves are small pore molecular sieves.

11. The membrane of claim 1 wherein: the molecular sieves have the structure of at least one of AEI, CHA, ERI, LEV, AFX, AFT, and GIS.

12. A method for separating gas components from a feedstream containing a mixture of gas components, the method comprising:
   (a) providing a mixed matrix membrane including a continuous phase polymer having molecular sieves interspersed therein, the membrane having feed and permeate sides, the polymer having a $CO_2$/$CH_4$ selectivity of at least 20 and the molecular sieves having a mesoporosity of at least 0.1 cc STP/g; and
   (b) directing a feedstream containing a mixture of first and second gas components to the feed side of the membrane and withdrawing a retentate stream depleted in the first gas component from the feed side and withdrawing a permeate stream enriched in the first gas component from the permeate side;
   wherein the $CO_2$ permeability of the mixed matrix membrane is increased by at least 30% with any decrease in selectivity being no more than 10% relative to a membrane made of the neat polymer.

13. The method of claim 12 wherein: the gas components which are separated are carbon dioxide and methane.

14. The method of claim 12 wherein: the molecular sieves are small pore molecular sieves.

15. The method of claims 12 wherein: the molecular sieves have the structure of at least one of AEI, CHA, ERI, LE,I AFX, AFT, and GIS.

16. The method of claim 12 wherein: the molecular sieves are selected from the group comprising CVX-7 and SSZ-13.

17. The method of claim 12 wherein: the molecular sieves have a mesoporosity of at least 0.15 cc STP/g.

18. The method of claim 12 wherein: the permeability of the mixed matrix membrane is increased by at least 50% with any decrease in selectivity being no more than 10% relative to a membrane made of the neat polymer.

19. The method of claim 12 wherein: the polymer has a $CO_2$/$CH_4$ selectivity of at least 30.

20. A method of making a mixed matrix membrane comprising:
   mixing inorganic molecular sieves with a polymer in a solution, the inorganic molecular sieves having a mesoporosity of at least 0.1 cc STP/g and the polymer having a $CO_2$/$CH_4$ selectivity of at least 20;
   forming a mixed matrix membrane with the molecular sieves interspersed in a continuous phase of the polymer;
   wherein the $CO_2$ permeability of the mixed matrix membrane is increased by at least 30% with any decrease in selectivity being no more than 10% relative to a membrane made of the neat polymer.

21. The method of claim 20 wherein: the mesoporosity of the molecular sieves is at least 0.15 cc STP/g.

22. The method of claim 20 wherein: the neat polymer has a selectivity of at least 30.

23. The mixed matrix membrane of claim 20 wherein: the step of forming a mixed matrix membrane includes spinning the solution, including the inorganic molecular sieves and polymer, into hollow fibers.

24. The membrane of claim 6, wherein the polymer is selected from polysulfones; poly(styrenest including styrene-containing copolymers comprising acrylonitrilestyrene copolymers, styrene-butadiene copolymers and styrene-vinylbenzylhalide copolymers; polycarbonates; cellulosic polymers, comprising cellulose acetate-butyrate, cellulose propionate, ethyl cellulose, methyl cellulose, nitrocellulose; polyamides and polyimides, including aryl polyamides and aryl polyimides; polyethers; polyetherimides; polyetherketones; poly(arylene oxides) comprising poly(phenylene oxide) and poly(xylene oxide); poly(esteramide-diisocyanate); polyurethanes; polyesters (including polyarylates), comprising poly(ethylene terephthalate), poly(alkyl methacrylates), poly(acrylates), poly(phenylene terephthalate); polypyrrolones; polysulfides; polymers from monomers having alpha-olefinic unsaturation other than mentioned above comprising poly (ethylene), poly(propylene) poly (butene-1), poly(4-methyl pentene-1), polyvinyls comprising poly(vinyl chloride), poly(vinyl fluoride), poly(vinylidene chloride), poly(vinylidene fluoride), poly(vinyl alcohol), poly(vinyl esters) comprising poly(vinyl acetate) and poly(vinyl propionate), poly(vinyl pyridines), poly(vinyl pyrrolidones), poly(vinyl ethers), poly(vinyl ketones), poly(vinyl aldehydes) comprising poly(vinyl formal) and poly(vinyl butyral), poly(vinyl amides), poly(vinyl amines), poly(vinyl urethanes); poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; and interpolymers, including block interpolymers containing repeating units from the above comprising terpolymers of acrylonitrile-vinyl bromide-sodium salt of para-sulfophenylmethallyl ethers; and grafts and blends containing any of the foregoing, wherein typical substituents providing substituted polymers include halogens comprising fluorine, chlorine and bromine; hydroxyl groups; lower alkyl groups; lower alkoxy groups; monocyclic aryl; and lower acyl groups.

* * * * *